INVENTORS
WILLIAM A. MILLER
ALTON C. SLEGGS
ATTORNEY

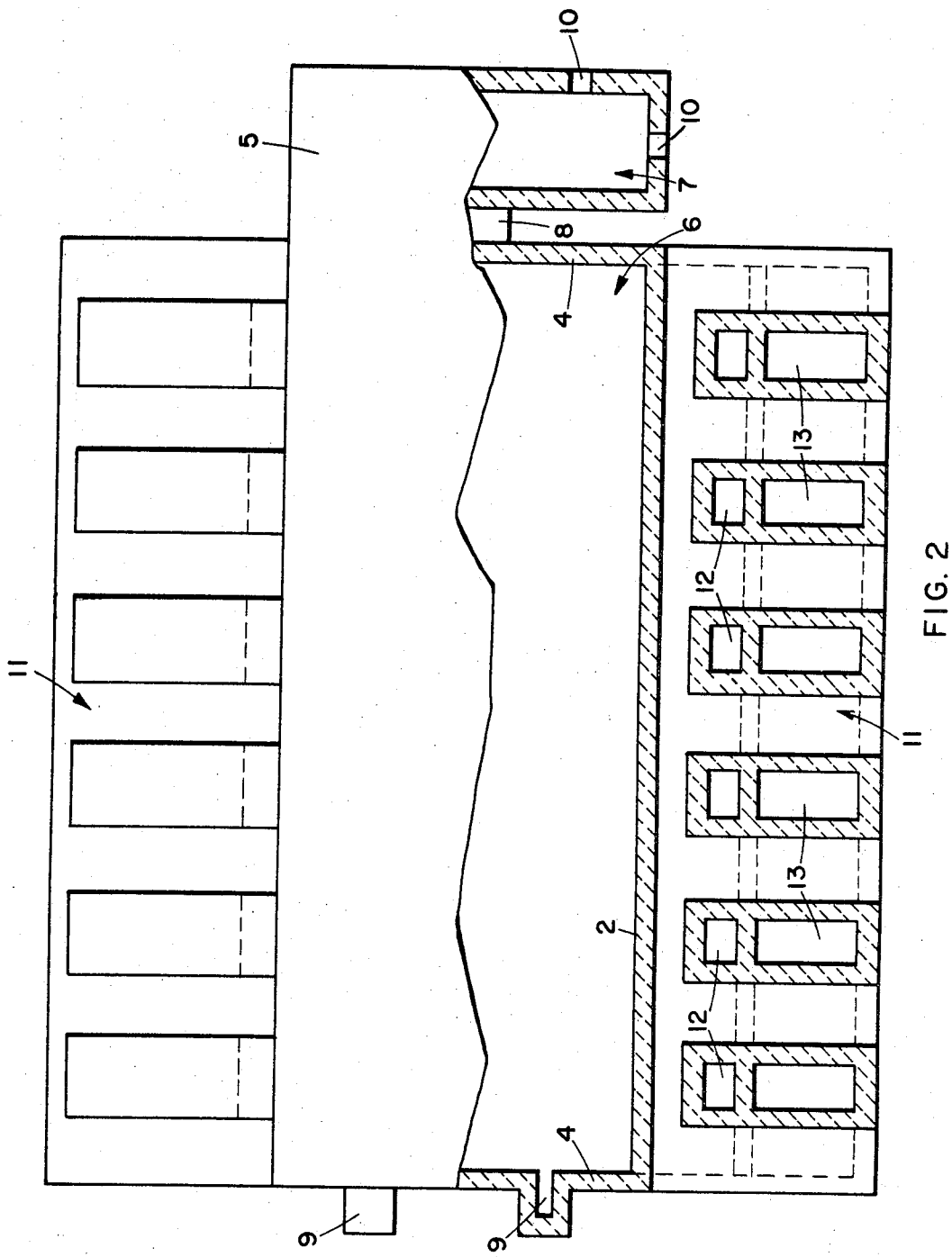

United States Patent Office 3,708,562
Patented Jan. 2, 1973

3,708,562
COATING FUSED CAST BLOCKS WITH REFRACTORY PAPER TO PREVENT SPALLING IN HOT REPAIRS
Alton C. Sleggs, Lewiston, and William A. Miller, Jamestown, N.Y., assignors to The Carborundum Company, Niagara Falls, N.Y.
Continuation-in-part of application Ser. No. 866,556, Oct. 16, 1969. This application Oct. 1, 1971, Ser. No. 185,622
Int. Cl. F27d 1/06, 1/16
U.S. Cl. 264—30                    3 Claims

ABSTRACT OF THE DISCLOSURE

A method of repairing a furnace, for example, a glass tank, while it is at operating temperature, with a fused cast refractory block comprising coating or otherwise applying a refractory insulating material on at least the faces of the block which will be exposed to the furnace interior and which will be adjacent to the existing hot refractory lining, and positioning the thusly insulated block at the repair site. The insulating material must be compatible with the process being performed in the furnace and must remain substantially intact and in place on the block until the temperature of the fused cast block exceeds the critical spalling or cracking temperature of the block.

BACKGROUND

Figure 1:
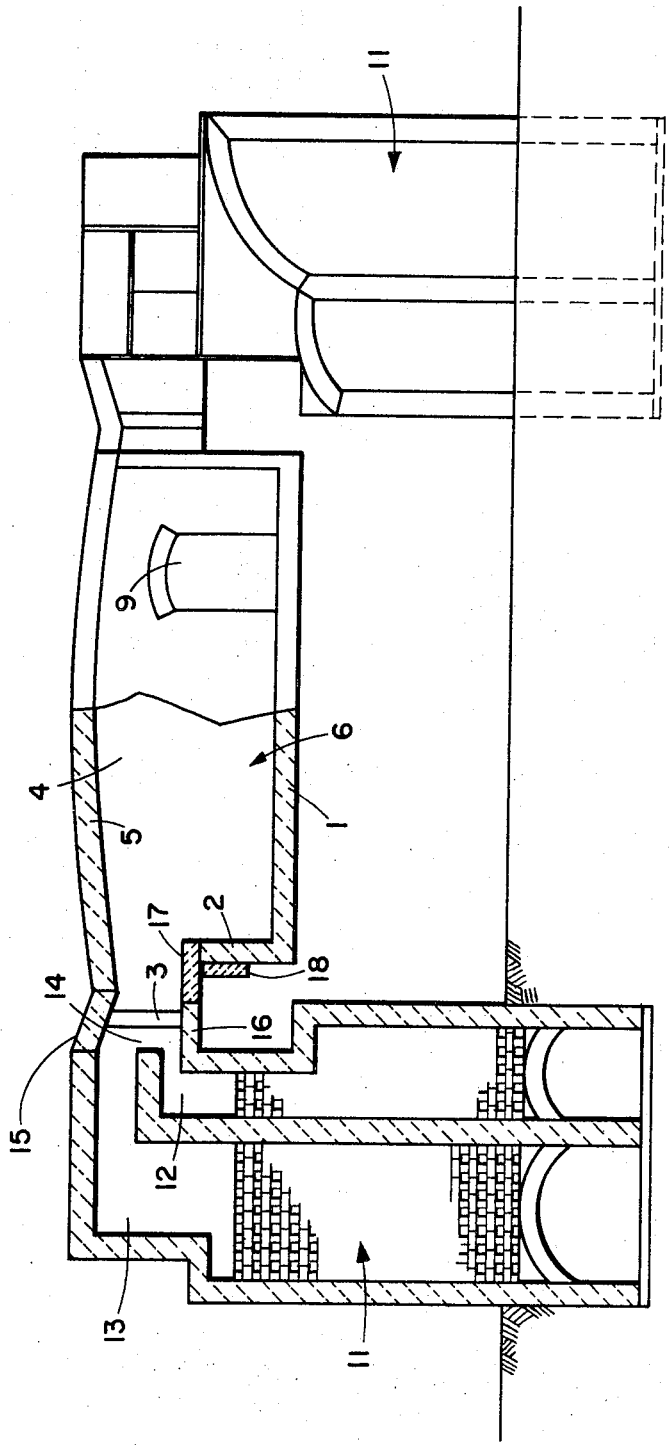

This application is a continuation-in-part application of copending application Ser. No. 866,556, filed Oct. 16, 1969 and now abandoned.

Fused cast refractory blocks are used to line furnaces in which high temperature processes are carried on, such as glass tanks, and, more recently, iron-making blast furnaces because such blocks have excellent densities (excluding from consideration the large voids characteristic of some fused cast blocks) making them very resistant to erosion and corrosion at high temperatures. By erosion is meant the physical abrasion or wearing away of the refractory block by melts or gasses moving over the surfaces of the block. Corrosion is substantially a chemical process whereby melts or even reactive atmospheres react with the refractory surfaces to form low melting reaction products and gradually take the surface of the block into solution. In most furnace applications of the type described, the refractory blocks are slowly consumed as a result of combinations of these and other destructive mechanisms such as thermal spalling and cracking. Fused cast refractories, while very resistant to erosion and corrosion, are prone to thermal spalling and cracking when subjected to rapid fluctuations in temperature. However, once the hot face of a fused cast block exceeds a critical temperature, which temperature depends upon the particular composition of the block and other factors but is typically around 1200° C., the thermal spalling resistance of the fused cast block is usually satisfactory.

Glass tanks and blast furnaces are built to endure for extended "compaigns" which may last over a period of several years. Generally, these furnaces are operated until the overall refractory lining becomes dangerously thin, at which time the furnaces are shut down and rebuilt. Frequently, however, one area of the refractory lining of the furnace wears away before it is necessary or desirable to rebuild the entire furnace. In these instances, the worn area of the lining is, where possible, replaced without shutting the furnace down or even interrupting the process performed therein.

This invention is directed primarily, but not exclusively, to the repair of glass tanks. Continuous glass tanks are almost universally used where large quantities of glass are being manufactured. In these continuous tanks, raw materials are fed in at a more or less steady rate at one end of the furnace and molten glass is drawn off continuously at the other end. The furnace consists of a melting chamber in which fuel and combustion air are introduced through ports. The fuel and combustion air are preheated by a series of regenerators which are typically operated on about a 20-minute cycle. Usually, the melting chamber is connected to a refining section by a throat covered by a skimmer block which extends below the surface of the glass. The refining section may or may not receive direct heat but is kept hot by conduction and radiation from the melting section. The temperature in the melting section is typically about 1430° C. to 1540° C. The refining section is maintained at a temperature of about 1260° C. From the refining section the glass is drawn out into forehearths that often have separate burners to maintain a uniform temperature of the glass therein.

In modern glass tanks, the hearth, sidewalls, tuckstones, burner blocks, skimmer blocks, port crowns and plates, among others, are built with fused cast refractory blocks. The blocks which are most severely worn are the sidewall blocks at about the "metal-line" (molten glass surface) and those which are subject to cyclic temperatures such as the tuckstone or plate blocks under the port. Should any of these blocks become severely worn, it may be necessary either to replace them, for example, in the case of tuckstones, or to back them up with "overcoat" blocks, as in the case of worn sidewall blocks.

As fused cast refractory blocks have a tendency to spall and crack due to thermal stresses created by temperature gradients, it is very difficult to insert them into a furnace which is at operating temperatures. In the past, several methods have been used to insert fused cast refractory blocks into furnaces at operating temperatures, for example, the blocks have been heated to approximately 650° C. in an auxiliary furnace, removed from the auxiliary furnace and covered with an asbestos blanket. Thereafter, the blocks are rapidly moved to the glass tank and inserted in position. This technique has several drawbacks: first of all, it is still very likely that the fused cast refractory block will break or crack after it has been inserted in the furnace. Also, it is a dangerous technique as it is necessary for hot blocks weighing anywhere from 20 to 70 kilograms to be manhandled under very adverse conditions. Another technique for placing fused cast blocks in hot furnaces has been to "inch" the repair block, with or without an initial preheating, into the furnace over an extended period of time. This is a very inconvenient method and is very likely to result in spalled or cracked blocks. Furthermore, there are positions in the furnace in which it is not possible to slide a new block into position.

According to this invention, there is provided a technique of repairing furnaces with fused cast refractory blocks that does not require handling the blocks while they are hot nor does it require the time-consuming technique of "inching" the blocks into position. Most important of all, however, when furnaces are repaired according to the reachings of this invention, there is little or no likelihood that the fused cast blocks will be cracked or spalled by thermal shock.

THE INVENTION

According to this invention, furnaces at operating temperature are repaired by replacing fused cast refractory blocks or backing up worn refractory blocks with overcoat blocks comprised of fused cast refractory. The new refractory block is first provided with an insulating refractory layer or coating on at least the faces of the block to be exposed to the furnace interior and the faces of the block which will be adjacent hot refractory blocks already within the furnace. It is preferable according to the teachings of this invention that the refractory insulating coating or layer cover all sides of the fused cast replacement or overcoat block. The coating comprises a refractory insulating material which must be compatible with the process being practiced in the furnace. In other words, since the coating exposed to the furnace interior is eventually taken into solution by the melt, e.g., molten glass, it must have a composition which will not deleteriously affect the melt. The refractory insulating material, while of limited life, must also be sufficiently refractory to remain substantially intact until the hot face temperature of the block exceeds a critical spalling temperature. The critical temperature depends on the composition and shape of the block but is typically around 1200° C. It is believed that the coating permits the block to achieve its operating temperature in a way that enables the stresses developed by differential thermal expansion to be accommodated.

The coating or layer may be applied in several forms. Preferably, it comprises a refractory fiber paper which is secured to the desired faces of the fused cast refractory block with a suitable refractory cement such as sodium silicate or silica sol. The composition of the refractory fibers may vary according to the temperature of the furnace being repaired. In most instances where a glass tank is being repaired, the refractory fibers must be of the alumina-silica variety, prepared, for example, by melting and fiberizing a mixture of alumina and silica in approximately equal proportions by weight. In some instances where the temperature of the furnace is not so severe, it may be permissible to use refractory paper comprising asbestos fibers. Since the composition of most glasses includes alumina and silica, alumina-silica fibers are compatible with the glass making process. According to another mode of praticing this invention, a coating is applied as a refractory fiber paste. The paste comprises suitable refractory fibers and a refractory binder such as sodium silicate or silica sol.

The thickness of the refractory fiber coating or layer will depend upon the temperature of the furnace being repaired, the composition and shape of the fused cast block being inserted into the furnace and the thermal conductivity of the coating. Generally, a coating or layer that is at least about 0.8 mm. thick and preferably, in cases of very high temperatures, at least about 3.2 mm. thick, is used. The coating has a thermal conductivity from about 0.00006 to 0.001 gm. cal./sec. cm.$^2$.° C./cm. from 530° C. to 1090° C. Preferably the thermal conductivity is from about 0.0001 to 0.0005 gm. cal./sec. cm.$^2$.° C./cm. from 530° C. to 1090° C.

Further features and other objects and advantages of this invention will be apparent from the following detailed description which is made with reference to the drawings in which:

FIG. 1 is a schematic plan view in half section of a regenerative type glass furnace; and FIG. 2 is a schematic half section on the center line of the first port of a regenerative type glass furnace.

Referring now to the drawings, a typical glass tank has a hearth 1 and sidewalls 2 comprised of large fused cast refractory blocks. The furnace is enclosed by breast walls 3, end walls 4 and a crown 5. The tank is divided into a melting section 6 and a refining section 7 joined by a throat 8. The raw batch is fed into the furnace through the dog houses 9. Molten glass is drawn from the refiner 7 through the openings 10 into forehearths (not shown). Adjacent each side of the melting section 6 are regenerators 11 provided with a plurality of uptakes for fuel 12 and air 13. The regenerator uptakes open into the melting section through a plurality of ports 14 defined in part by a port crown 15 and plate blocks 16. Tuckstones 17 bridge the gap between the ports 14 and breast walls 3 and the sidewalls 2. The numeral 18 designates an overcoat block which has been positioned behind the sidewall 2 adjacent the tuckstone 17. Other nomenclature is sometimes used to define various blocks that comprise a glass tank, for example, the tuckstones at the port openings are often referred to as sill blocks and port aprons. Obviously, many construction variants are possible.

EXAMPLE I

A glass tank was repaired at operating temperatures according to the teachings of this invention. The glass tank lining had been worn through at the sill block or port apron 17 and the adjacent top of the sidewall blocks 2 beneath four ports and overcoat blocks which had previously been installed behind the lining were also worn. At the time of the repair, the openings in the lining were about 7.5 cm. high and approximately 30.5 cm. wide. The furnace was kept operating during the repair period; however, the level of the glass was dropped approximately 7.5 cm. from its normal position which is approximately 2.5 cm. below the original height of the sidewall blocks. The worn overcoat blocks at the metal-line were removed; thereafter, the blocks were replaced with 30.5 x 7.6 x 15.25 cm. fused cast refractory blocks of the alumina-zirconia-silica type which were solid cast tile, that is, they had no shrinkage voids. The replacement blocks were first coated by wrapping with a refractory insulating paper. The particular paper used is sold under the trademark Fiberfrax® by The Carborundum Company, Niagara Falls, N.Y. This paper is but exemplary of other suitable refractory fiber papers commercially available. The paper was comprised substantially of alumina-silica fibers and an inorganic binder. The paper had a bulk density of 0.24 gm./cm.$^3$ and thermal conductivity within the range of 0.000103 to 0.000518 gm. cal./sec. cm.$^2$.° C./cm. from 530° C. to 1090° C. The paper was approximately 0.8 mm. thick and was secured to the tile by a refractory cement of the sodium silicate type. The cement was allowed to partially dry and then the coated blocks were inserted into position without preheating. Approximately ten of the refractory blocks were installed to cover the four holes in the lining. No cracking or breaks in the replacement tile were visible or apparent when they were inspected several days after this repair. This was indeed surprising because in the past overcoat blocks of the alumina-zirconia-silica fused cast type had tended to crack and spall even when they had first been gradually heated to a high temperature or when inserted into place by slowly "inching" the overcoat blocks into position so as to gradually expose them to the furnace interior. A large percentage of these blocks had been severely spalled and broken from the intense thermal shock exposure.

EXAMPLE II

Replacement of overcoat blocks is only one of many applications of this invention to repair of glass tanks. For example, it is possible to replace such critical portions of the furnace as sills and tuckstones 17. It was necessary to replace the tuckstones in a glass tank while operating, as they had become severely damaged due to the cyclic temperature conditions to which they had been subjected. Two 45.7 x 15.25 x 7.6 cm. solid fused cast refractory tiles of the alumina-zirconia-silica type where coated on all sides with a layer of refractory fiber paper (Fiberfrax® 970–A paper) which was 0.8 mm. thick. The paper was secured to the replacement blocks with a refractory cement. The damaged blocks were removed and the replacement blocks were inserted in their positions without any preheating whatsoever. No cracking or spalling of the replacement blocks took place. This was considered quite surprising in view of the fact that several other techniques had failed; for example, similar tile without the refractory fiber coating been heated to 650° C. in an auxiliary furnace, moved to the glass tank while covered with an asbestos blanket to minimize heat loss, and then positioned in the glass tank in the identical position within five minutes after being removed from the auxiliary furnace. The preheating did not prevent the eventual breakage of the blocks within some thirty minutes to an hour following their installation in the sill or tuckstone area of the operating glass furnace.

While this invention has been described primarily with reference to glass tanks, it should be obvious that it is applicable to any type of furnace wherein it is neccessary to replace a fused cast refractory block.

Having thus described my invention in detail and with the particularity required by the patent law, what is desired to have protected by Letters Patent is as follows.

I claim:

1. A method of repairing a refractory lined furnace in which high temperature processes are performed without substantially discontinuing those processes and with a fused cast refractory block comprising the steps of cementing a layer of alumina-silica fiber refractory paper to a fused cast refractory block with an inorganic refractory cement, said refractory paper having a thickness of at least 0.8 mm. and having a thermal conductivity from about 0.00006 to about 0.001 gm. cal./sec. cm.$^2$ ° C./cm. from about 530° to about 1090° C., applying said layer to at least the faces of the fused cast refractory block to be exposed to the furnace interior and to faces of the block to be adjacent the existing hot refractory lining, and positioning the coated block at the repair site whereby said block has substantially no tendency to spall or crack while acquiring its operating temperature gradient.

2. A method according to claim 1 wherein the thermal conductivity is from about 0.0001 to about 0.0005 gm. cal./sec. cm.$^2$ ° C./cm. from about 530° C. to about 1090° C.

3. A method according to claim 1 wherein the thickness of the refractory paper is at least about 3.2 mm.

References Cited

UNITED STATES PATENTS

| | | | |
|---|---|---|---|
| 3,436,203 | 4/1969 | Wu | 264—30 |
| 3,467,535 | 9/1969 | Myles | 264—30 |
| 3,467,542 | 9/1969 | Nordlie | 264—30 |
| 3,480,125 | 11/1969 | Ash | 264—30 |

FOREIGN PATENTS

| | | | |
|---|---|---|---|
| 1,931,802 | 9/1970 | Germany | 65—374 |

DONALD J. ARNOLD, Primary Examiner

J. H. MILLER, Assistant Examiner

U.S. Cl. X.R.

65—27, 374; 264—60; 266—43